UNITED STATES PATENT OFFICE.

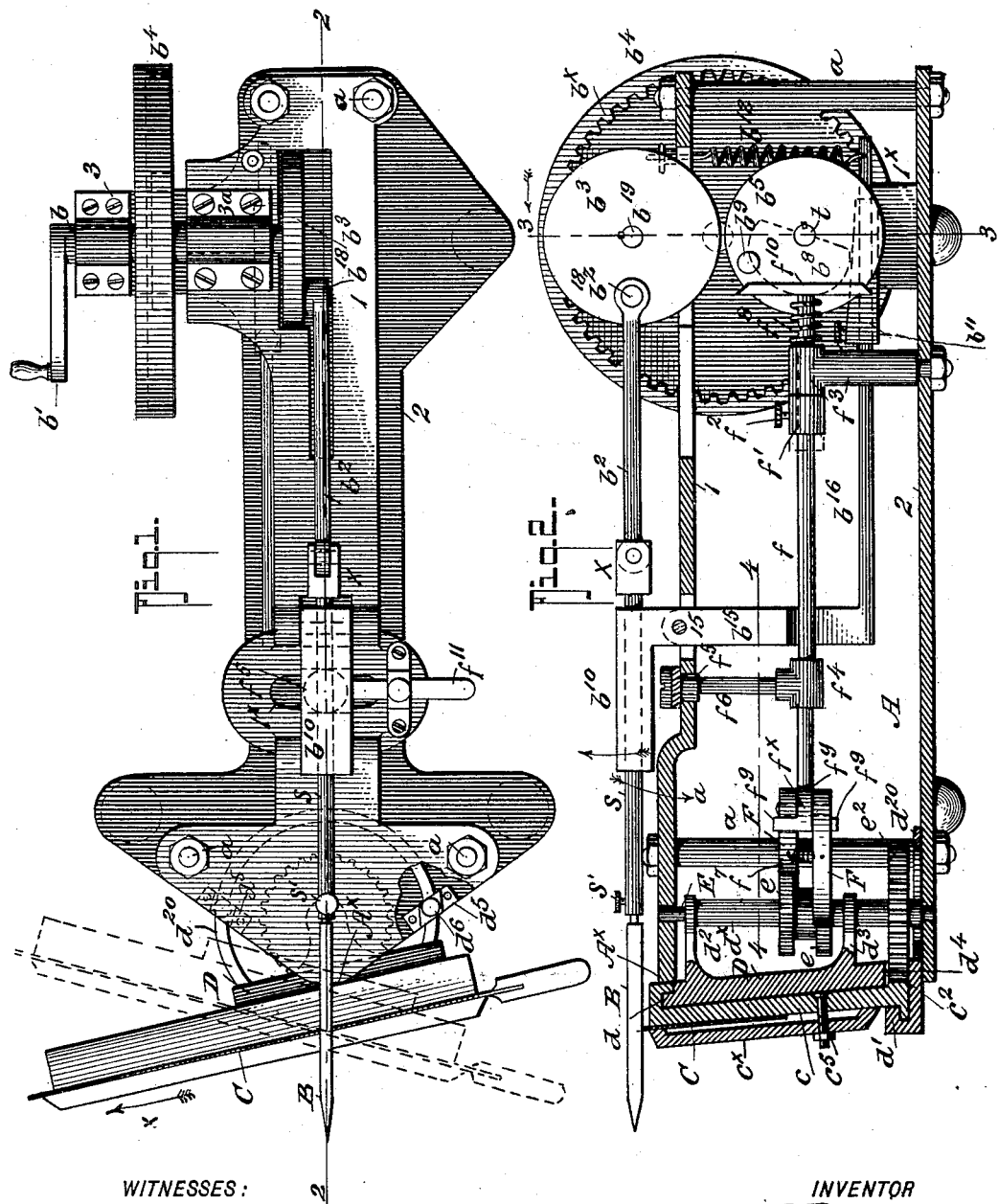

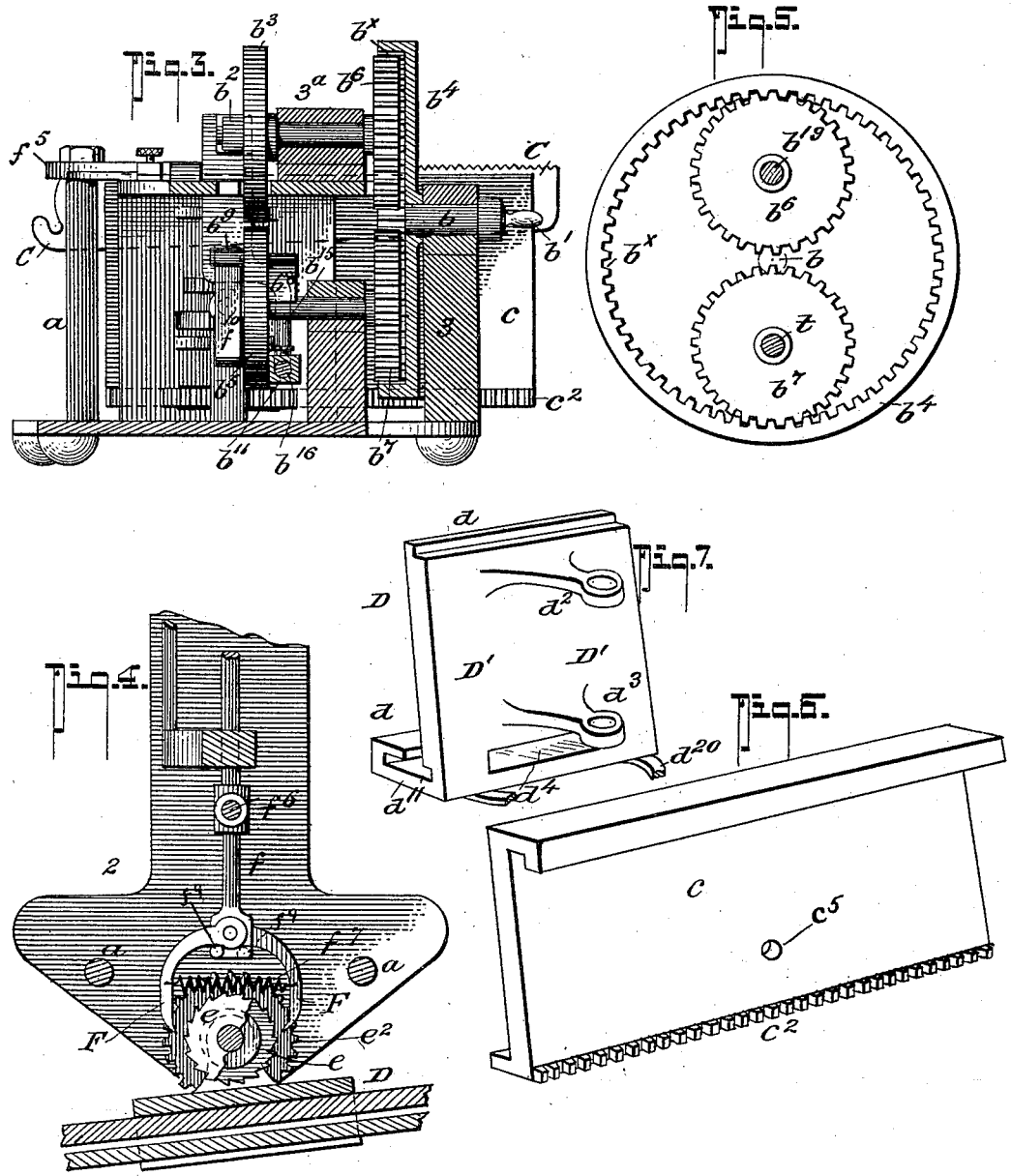

RUBEN P. PHELPS, OF WACO, TEXAS.

SAW-SHARPENING MACHINE.

SPECIFICATION forming part of Letters Patent No. 693,667, dated February 18, 1902.

Application filed April 29, 1901. Serial No. 58,035. (No model.)

*To all whom it may concern:*

Be it known that I, RUBEN P. PHELPS, residing at Waco, in the county of McLennan and State of Texas, have invented a new and Improved Saw-Sharpening Machine, of which the following is a specification.

My invention relates to improvements in that class of saw-sharpening machines in which straight-edge-filing devices reciprocally movable are provided and in which ratchet mechanism for feeding the saw is also included.

My invention in its generic nature comprehends a novel and easily-manipulated means for reciprocating the file coöperatively connected with the saw-feeding mechanism, whereby the saw is fed along automatically as the file is moved to its backward direction, the file-operating means including devices for lifting the file from engagement with the saw as said saw is moved forward.

In its more complete nature my invention includes mechanism for filing every other one of the saw-teeth as the saw is automatically moved in one direction and for likewise engaging the alternate or skipped teeth as the saw is automatically fed back or in the reverse direction, the saw-feeding means including a novel construction of turn-table mechanism for effecting the reverse feeding of the saw and a proper angle-cutting of the file. Again, this invention embodies an adjustable file-pressing means whereby the pressure on the saw can be set to suit the size of the teeth to be sharpened and whereby the feed of the saw can also be set to suit the saw being operated upon.

In its more subordinate features my invention consists in certain details of construction and peculiar combination of parts, all of which will hereinafter be fully described, and particularly pointed out in the appended claims, reference being had to the accompanying drawings, in which—

Figure 1 is a plan view of my improved saw-sharpening machine. Fig. 2 is a vertical longitudinal section of the same, taken practically on the line 2 2 of Fig. 1. Fig. 3 is a transverse section taken practically on the line 3 3 of Fig. 2 looking in the direction of the arrow. Fig. 4 is a detail horizontal section taken on the line 4 4 of Fig. 2. Fig. 5 is a view of the master drive-gear and the supplemental drive-gears that coöperate therewith. Fig. 6 is a view of the saw-feeding rack. Fig. 7 is a view of the turn-frame that supports the said feeding-rack.

Referring now to the drawings, in which like letters and numerals indicate like parts in all the figures, A designates the supporting-frame, which includes the upper and lower members, held together by the standards $a\,a$, bolted to the members 1 and 2, as clearly shown.

B designates an ordinary saw-file, and C the saw.

Mounted on a suitable bearing 3 on the main frame is a shaft $b$, having a crank-handle $b'$, and a large or master drive-wheel $b^4$, fixedly connected thereto to turn therewith. The wheel $b^4$ has an internal gear-rim $b^\times$. (See Figs. 2 and 5.)

$b^3$ designates a disk having a wrist or eccentric pin $b^{18}$ and mounted upon a shaft $b^{19}$, journaled in a bearing $3^a$ on the top frame member 1 and in line above the axis of the shaft $b$. The shaft of disk $b^3$ carries a gear-wheel $b^6$, that meshes with the internal gear-rim $b^\times$ of wheel $b^4$ and from which it receives motion.

$b^2$ is a pitman pivotally joined at one end to the wrist-pin and at the other end to the head-piece $x$ of the file-receiving socket-piece $s$, to which the file-shank extends and is held by the set-screw $s'$, as shown.

So far as described it will be readily apparent that by turning the wheel $b^4$ a reciprocating motion is imparted to the file through the crank-disk $b^3$.

In my complete machine the saw is fed automatically in reverse direction, and the feed-movement is timed to move the saw a distance of two teeth at each complete movement of the file-holder and to cause the file to engage the saw on its forward thrust only and skip, as it were, every other tooth as the saw is moved along, to engage each alternate tooth as the saw is moved forward, and the other alternate or unfiled teeth when the saw moves backward. For this purpose the socket member $s$ is held to slide in a guide $b^{10}$, disposed in a horizontal plane and forming a part of the rocker-frame $b^{15}$, which is pivotally mounted at 15 in the frame member 1 to swing in a vertical plane. The lower end of frame $b^{15}$ has a rearwardly-extending rod $b^{16}$, upon which is adjustably held a wedge-block $b^{11}$, the purpose of which will presently appear, and to hold the guide $b^{10}$ to its normal or horizontal position a coiled spring $b^{12}$ is made fast to the inner end of the part $b^{16}$ and to the frame member 1, as clearly shown in Fig. 2.

$l^\times$ denotes a bearing-post projected up from the bottom member of the frame A, (see Fig. 3,) in which is journaled a shaft $t$, whose axis is in vertical alinement with the axis of the wheel $b^4$ and wheel $b^3$, and said shaft $t$ carries a cog-wheel $b^7$, held to mesh with internal gear-rim of the wheel $b^4$, and at its outer end it has a disk $b^5$, having on its inner face a fixedly-held cam $b^8$ and a wrist-pin $b^9$ on its outer face, the reason for which will presently appear.

The several parts—disks $b^3 b^5$, the cam-piece $b^{11}$, cam $b^8$, and the saw-file-operating pitman and the master-wheel—are coöperatively so held that on the beginning of the return stroke of the file the cam $b^8$ will engage the part $b^{11}$, tilt the file-carrying frame up in the direction indicated by the arrow, and thereby lift the file from engagement with the saw and permit the saw-feeding mechanism to move the saw forward a predetermined distance to bring the next tooth to be filed in position during the backward stroke of the file, which as soon as the saw is thus fed and it (the file) has reached the limit of its back thrust again drops to a horizontal position and in line to engage with the new tooth to be filed as it (the file) is moved forward, it being understood such return movement of the file to a horizontal plane is effected by reason of the cam $b^8$ disengaging the member $b^{11}$ and the spring $b^{12}$ pulling the arm $b^{16}$ up to rock the upper part $b^{10}$, with file down in the direction indicated by arrow $a$ in Fig. 2.

$d^2$ $d^3$ indicate brackets mounted on the frame-rod E to rock thereon. The two brackets are joined by the tubular member $d^\times$, and they extend outward and form an integral or fixedly-held part of the turn-table D, the construction of which is best shown in Figs. 1 and 7, and consists of the vertical guide-piece, having a guide-tongue $d$ at the upper edge, and an outwardly-projecting base-flange $d^{11}$, having a guide portion $d'$, and the part $D'$ has a slot $d^4$ near the bottom disposed centrally of an inwardly-extended semicircular horizontal guide-rod $d^{20}$, movably and adjustably held in brackets $d^5$ $d^5$, secured on the bottom member of the frame A (see Fig. 1) and having clamp-screws $d^6$ for holding the said guide $d^{20}$ to its adjusted positions, and to facilitate the swinging of the saw holder or carrier the parts D $d^2$ and the members $d^3$ $d^6$ are correlatively so arranged that the member D will have as its axial or fulcrum point the centrally-extended portions $A^\times A^\times$ of the frame, as clearly shown in Figs. 1 and 2.

The saw-carrier proper consists of a body part $c$, having at its upper end an inwardly-extending flange to engage upper guide portion $d$ of the member D, and at its lower end it has an outwardly-projecting base to engage the part $d'$ of the member D, and on its inner face said part $c$ has a rack $c^2$, held in alinement with the slot $d^4$ in turn-table D, as best shown in Fig. 2. To hold the saw on the member $c$, a detachable clamp-plate $c^\times$ is provided, made fast by the bolt-and-nut devices $c^5$, as shown.

The spindle or shaft E, before referred to, is rotatably mounted on frame A, centrally of the forward end thereof, and in a longitudinal plane with the fulcrum-point of the turn-table D, and upon the lower end of said shaft is fixedly mounted a cog-wheel $e^2$, adapted to project through the slot $d^4$ in member D and mesh with the rack $c^2$ on the carrier $c$.

$e$ $e$ indicate a pair of superimposed ratchet-wheels mounted on the shaft E, with which coöperate a pair of pawls F F, pivotally connected at their inner end upon a stud $f^\times$, common to both pawls and forming a part of the head-piece $f^y$ of the plunger-rod $f$, reciprocally held in the bearings $f^3$ and $f^6$, the former being secured to the bottom member of frame A and axially rotatable, and the other, $f^6$, is pendently held in the upper frame 1 and has movement in a horizontal plane in an arc having the post or bracket $f^3$ as its center, the reason for which will presently appear, and to facilitate such adjustment the bracket $f^6$ is hung from a block $f^5$, slidable in the curved slot $1^\times$ in the frame part 1, a handle-piece $f^{11}$ being connected to the block $f^5$ for shifting it, as clearly shown in Fig. 1. A coiled spring $f^7$ is joined to the two pawls F F to draw them to their inner position, and stops $f^9$ are formed on the head part $f^\times$ of the rod $f$ to limit the inward movement of the pawls, as clearly shown in Figs. 2 and 4, in which the rod $f$ is shown adjusted to throw both pawls F out of an operative position.

$f^{10}$ is a vertical cross-bar mounted upon the inner end of the rod $f$, adapted to be engaged by the wrist-pin $b^9$ on the disk $b^5$ and to provide for setting the bar $f^{10}$ to or from the axis of the disk $b^5$, which engages the bar $f^{10}$ at predetermined intervals, or, in other words, to increase or decrease the intervals between its forward reciprocation of the rod $f$. A spring $f^8$ is interposed between the head $f^{10}$ and the bearing-post $f^3$, which shifts the rod $f$ backward, and a collar $f'$, held by set-screw $f^2$, is mounted on the bar $f$ to engage with the opposite side of post $f^3$ and limit the movement of the cross-bar $f^{10}$ toward the axis of disk $b^5$.

From the foregoing description, taken in connection with the accompanying drawings, the manner in which my saw-filing machine operates is best explained as follows: Assuming the saw is to be moved in the direction indicated by the arrow $x$ and the turn-table adjusted to provide for filing the tooth at the angle desired, the block $f^5$ is moved to bring the lower pawl F to engage with its ratchet-wheel $e$, so that the forward thrust of the bar $f$ will turn wheel $e^2$ and correspondingly, through the media of the rack $c^2$, moves the saw forward the distance desired, which is governed by the correlation of parts $f^{10}$, disk $b^5$, and its wrist-pin $b^9$, it being understood that during the rotation of the disk $b^5$ at proper times the frame $b^{15}$, in which the file-holder reciprocates, is lifted to permit the feed of the saw. The saw after having its alternate teeth filed going in one direction is then caused to move backward to permit the file to engage the unfiled teeth. This operation is effected by shifting the turn-table over to the position shown in dotted lines in Fig. 1 and by moving the rod $f$ over to cause the pawl F to engage with the upper ratchet-wheel $e$ to cause it to rotate the shaft or spindle E, with the cog-wheel $e^2$, in a reverse direction. To increase or decrease the distance which the saw should move for fine or coarse teeth, it is only necessary to adjust the collar $f'$, and to regulate the lift movement of the file the wedge $b^{11}$ is moved away from or farther under the axis of the disk $b^5$.

By combining the several parts in the manner described and shown the same provides for filing a framing-saw or any straight-edge saw and at any angle. It is obvious the several parts referred to may be readily combined and constructed to make one or more strokes on the saw before having the saw move forward by changing the ratio of diameters of the gears $b^6$ and $b^7$.

Changes in the details and modifications of the construction shown may also be made without departing from the scope of the appended claims.

Having thus described my invention, what I claim, and desire to secure by Letters Patent, is—

1. The combination with the saw-carrier, and the main frame; of the main drive-shaft, the master gear-wheel $b^4$, the disks $b^3 b^5$, geared with the master-wheel, the disk $b^5$, having a cam $b^8$, the frame $b^{15}$, pivotally mounted upon the main frame, said frame $b^{15}$ having an arm $b^{16}$, the adjustable wedge $b^{11}$, mounted on the arm to coöperate with the cam $b^8$, and the pivotal link $b^2$, joining the file-holder with the disk $b^3$, all being arranged substantially as shown and for the purposes described.

2. The combination with the reciprocally-movable file, its supporting-frame and means for tilting said frame to raise the file at predetermined intervals; of the saw-holder, said holder including a carrier movable transversely to the file, said carrier having a rack portion, a gear for imparting motion to the said rack, and means for turning the gear in reverse directions, said means being coöperatively joined with the file-operating drive mechanism and including adjustable devices for regulating the turn of the operating-gear, connected with the saw-carrier rack, substantially as shown and for the purposes described.

3. The combination in a machine of the character described, with the reciprocally-movable file, and the means for operating it, and for swinging it out of engagement with the saw, on its backward movement; of the saw-holder, said holder including a carrier movable transversely of the file, said holder having a rack portion, the spindle E, the gear $e^2$, engaging the rack portion, said spindle having two ratchet-wheels $e\ e$, the teeth of which project in alternate directions, the plunger-rod having a pair of pawls, one for each ratchet-wheel $e$, means for shifting the plunger to engage with either one of the said ratchets, and devices coöperating with the main drive-shaft for imparting a forward thrust to the plunger-rod at predetermined intervals, for the purposes specified.

4. The combination with the reciprocally-movable and swinging file, and means for imparting such movements thereto, said means including the master gear-wheel $b^4$, and the saw-holder, said holder including the reversible movable saw-carrier, having a rack member; of the gear $e^2$, two ratchet-wheels $e\ e$, coöperating with the said gear $e^2$, the disk $b^5$, having a wrist-pin $b^9$, the plunger-rod $f$, said rod carrying two pawls, one for each ratchet-wheel $e$, supports for the said rod, means for adjusting the said rod in the said bearings in a longitudinal direction, a spring device for moving the rod to its backward position, the inner end of the said rod being formed to engage with the wrist-pin $b^9$, on the disk $b^5$, substantially as shown and described.

5. The combination with the main frame, the reciprocally-held file, means for lifting it from engagement with the saw at predetermined intervals, the saw-holder, said holder including a carrier $c$, having a rack-face $c^2$, the spindle E, gear $e^2$, and the ratchet-wheels $e$; of the post $f^3$, projected from the base of the frame, and having axial movement, the post $f^6$, having movement on an arc, whose center is the axis of the post $f^3$, means for setting the post $f^6$, to its adjusted positions, the rod $f$, reciprocating in the posts $f^6$ and $f^3$, said rod carrying a cross-head $f^{10}$, adapted to be engaged by the wrist-pin $b^9$, on the disk $b^5$, a spring $f^8$ for moving the rod $f$ in one direction, the pawls F F, and the stops $f^9$, and the spring $f^7$, all being arranged substantially as shown and described.

RUBEN P. PHELPS.

Witnesses:
N. B. WILLIAMS,
THOS. HARRISON.